United States Patent Office 2,992,082
Patented July 11, 1961

2,992,082
ANTI-SLUDGING HYDROCARBON FUEL OILS
James C. Ownby and Herman E. Davis, Kingsport, Tenn., assignors to Eastman Kodak Company, Rochester, N.Y., a corporation of New Jersey
No Drawing. Filed June 24, 1958, Ser. No. 744,051
5 Claims. (Cl. 44—66)

This invention relates to hydrocarbon fuel oils and more particularly to hydrocarbon fuel oils having improved resistance to sludge formation.

Fuel oils such as the various grades of furnace oils and diesel oils, and particularly those obtained by thermo or catalytic cracking processes, are very susceptible to the formation of a precipitate of a polymeric material commonly called sludge. The formation of sludge in fuel oils is highly objectionable as it plugs oil lines, burner jets, pumps and filter screens. Many additives to lubricating oils such as are used in the crank case of gasoline engines to inhibit the formation of deleterious deposits in such engines have proved to be relatively ineffective anti-sludging agents for fuel oils.

It is accordingly an object of this invention to provide new and improved materials for stabilizing hydrocarbon fuel oils against sludge formation.

It is another object of this invention to provide improved fuel oil additives as sludge inhibitors that can be effectively employed in relatively small amounts.

Other objects will be apparent from the description of the claims which follow.

These and other objects of the invention are obtained by incorporating into hydrocarbon fuel oils relatively small amounts of certain sucrose esters.

The sucrose ester additives of the invention comprise sucrose having one or two hydroxyl groups esterified with an aliphatic carboxylic acid having at least 8 carbon atoms, and preferably alkyl or alkenyl carboxylic acids having 14 to 18 carbon atoms. Sucrose esterified with such aliphatic carboxylic acids as caprylic acid, nonylic acid, capric acid, undecylic acid, lauric acid, tridecylic acid, myristic acid, pentadecylic acid, palmitic acid, oleic acid, stearic acid, arachidonic acid, behenic acid, etc., can be employed to prepare the subject sucrose esters. Likewise, polymerized mixtures of such fatty acids can be utilized.

The sucrose ester additives of the invention are monoesters or diesters or admixtures thereof. The more fully esterified esters of sugar are less effective as sludge inhibitors in fuel oils. The sucrose esters of the invention can be readily prepared by the alcoholysis of an aliphatic carboxylic acid ester of a volatile alcohol such as methanol or ethanol with sucrose, a typical reaction mixture comprising sucrose and methyl oleate. The particular sugar ester resulting from such an alcoholysis reaction can be varied by varying the molar ratio action of sucrose to the non-sugar ester. For example, from a 3 to 1 molar ratio of sucrose to non-sugar ester, about 90% of the non-sugar ester is converted to the monoester of sucrose. A similar percentage conversion to the diester of sucrose is achieved by employing a 1 to 2 molar ratio of sugar to non-sugar ester. The progress of the alcoholysis reaction can be followed during the reaction by collecting and measuring the amount of volatile alcohol produced. Basic alcoholysis catalysts such as sodium methoxide, sodium carbonate, sodium stearate, potassium oleate and other well-known basic alcoholysis catalysts in the usual catalytic amounts are employed in the preparation of the subject sucrose esters. The amount of catalyst can be varied in accordance with the usual practice with amounts of at least 0.01 to 1% being more generally employed. The unreacted sucrose can be washed from the resulting reaction mixture by treating it with a warm aqueous sodium chloride solution.

The preparation and purification of sucrose esters as used in the present invention is described in more detail in Ind. and Eng. Chem. 48, 1459–62 (1956).

The sucrose ester additives employed in this invention are highly effective anti-sludging additives for any of the common hydrocarbon fuel oils which are normally susceptible to sludge formation when employed in amounts of 0.001 to 0.1% by weight of additive based on the weight of the fuel oil. In most cases the additive is preferably employed in a concentration of 0.005 to 0.05% by weight.

The sucrose ester additives of the invention can be employed alone or they can be combined with other additives such as antioxidants, metal deactivators, combustion promoters and the like in accordance with usual practice.

The invention is further illustrated by the following examples of preferred embodiments thereof.

*Example 1*

A mixture of 1,026 grams (3 moles) of sucrose and 298 grams (1 mole) of the methyl ester of stearic acid was dissolved in dimethyl formamide and then heated with 0.1 mole of potassium carbonate at about 95° C. under a pressure of about 90 mm. of mercury until 1 mole of methanol was evolved. The resulting reaction mixture was washed with an aqueous 5% sodium chloride solution at about 85° C. The resulting product was a white powder which analytical data showed to be sucrose monostearate. The sucrose monostearate was added to a sample of No. 2 fuel oil at a 0.01% by weight level and tested as an anti-sludging additive by a modification of the Cities Service method described in Anal. Chem. 24, 1959 (1952). The test in brief comprised passing air through the sample of fuel oil heated at 210° F. for 24 hours. After cooling the sample to about room temperature, the sample was filtered through filter paper and the amount of sludge formed was judged visually. A No. 2 fuel oil sample containing no sucrose monostearate was included in the test for comparative purposes. When the sample used was the original fuel oil containing no sucrose monostearate additive, the filter paper was almost completely black. When the sample used contained the sucrose monostearate additive, the paper was light gray to white showing substantially complete inhibition of sludge formation.

*Example 2*

The reaction product of 342 grams (1 mole) of sucrose and 596 grams (2 moles) of the methyl ester of stearic acid was prepared by the method described in Example 1. The reaction was carried out until 2 moles of methanol had evolved. This product was a white solid which analysis showed to be sucrose distearate. When incorporated into No. 2 fuel oil at a concentration of 0.01% by weight, and tested as described in Example 1, it substantially completely inhibited the formation of sludge in the test sample.

*Example 3*

The reaction product of 3 moles of sucrose and 1 mole of the methyl ester of oleic acid was prepared by the method described in Example 1. The reaction was carried out until 1 mole of methanol had evolved. This reaction product was a soft, waxy solid, which on analysis was found to be sucrose monoleate, and when incorporated into No. 2 fuel oil at a concentration of 0.01% by weight, and tested by the method described in Example 1, the formation of sludge in the fuel oil was substantially completely inhibited.

Example 4

The reaction product of 1 mole of sucrose with 2 moles of the methyl ester of oleic acid was prepared by the method described in Example 1. The reaction was carried out until 2 moles of methanol had evolved. This reaction product was a viscous amber liquid which on analysis was shown to be sucrose dioleate, and when incorporated in No. 2 fuel oil at a concentration of 0.01% by weight, and tested as described in Example 1, the formation of sludge in the fuel oil was substantially completely inhibited.

Example 5

The reaction product of 1 mole of sucrose with approximately 1 mole (592 grams) of a commercial polymerized fatty acid having an average molecular weight of about 565 ("Emery 3079-5") was prepared by the method described in Example 1. The reaction was carried out until 2 moles of methanol had evolved. This reaction product was a viscous amber liquid and was shown on analysis to be a sucrose diester. When this diester was added to No. 2 fuel oil at a concentration of 0.01% by weight, and tested as described in Example 1, the diester effectively reduced sludge formation in the fuel oil. The monoester of sucrose prepared by reacting 3 moles of sucrose and 1 mole of the polymerized fatty acid by the method described in Example 1 also retards the formation of sludge at a 0.01% by weight level in No. 2 fuel oil.

Example 6

For comparative purposes several well-known lubricating oil additives were tested as anti-sludging additives for fuel oil. The various lubricating oil additives were added at a concentration of 0.01% by weight to No. 2 fuel oil and tested as described in Example 1. The lubricating oil additives tested were the following compositions: a hydrocarbon wax naphthalene condensate of the Friedel-Crafts type, a condensation product of phenol and chlorinated wax followed by further condensation with phthalyl chloride, a sulfurized wax thiomer, and an oil-soluble acrylic polymer. All of these lubricating oil additives were found to be ineffective anti-sludging additives for the fuel oil and showed a blackening of the filter paper in the test described in Example 1. Many other classes of disperents and detergents useful in other fields are also useless in preventing sludge formation in fuel oil.

Thus, by means of this invention a greatly improved class of sludge inhibitors for hydrocarbon fuel oils is provided. Because of their high activity, the additives embodying this invention can be successfully used in relatively lower concentrations than is possible with less active anti-sludging agents. The additives of the invention are readily prepared by simple and straightforward processes which can be readily effected on a commercial scale.

Although the invention has been described in detail with particular reference to certain preferred embodiments thereof, variations and modifications can be effected within the spirit and scope of the invention as described hereinabove and as defined in the appended claims.

We claim:

1. A hydrocarbon fuel oil containing 0.001% to 0.1% by weight of an ester selected from the group consisting of sucrose monoesters and sucrose diesters wherein the sucrose is esterified with an aliphatic carboxylic acid having at least 8 carbon atoms selected from the group consisting of alkyl carboxylic acids and alkenyl carboxylic acids.

2. A hydrocarbon fuel oil containing 0.005% to 0.05% by weight of an ester selected from the group consisting of sucrose monoesters and sucrose diesters wherein the sucrose is esterified with a carboxylic acid having 14 to 18 carbon atoms selected from the group consisting of alkyl carboxylic acids and alkenyl carboxylic acids.

3. A fuel oil composition as defined by claim 2 wherein the carboxylic acid is stearic acid.

4. A fuel oil composition as defined in claim 2 wherein the carboxylic acid is oleic acid.

5. A hydrocarbon fuel oil containing 0.005% to 0.05% by weight of an ester selected from the group consisting of sucrose monoesters and sucrose diesters wherein the sucrose is esterified with a mixture of polymerized fatty acids having at least 8 carbon atoms.

References Cited in the file of this patent

UNITED STATES PATENTS

| Number | Name | Date |
|---|---|---|
| 1,917,257 | Harris | July 11, 1933 |
| 1,959,590 | Lorand | May 22, 1934 |
| 2,198,210 | Musher | Apr. 23, 1940 |
| 2,548,347 | Caron et al. | Apr. 10, 1951 |
| 2,868,629 | Annable et al. | Jan. 13, 1959 |
| 2,868,781 | Gaertner et al. | Jan. 13, 1959 |
| 2,893,990 | Haas et al. | July 7, 1959 |